United States Patent [19]
Johnson et al.

[11] Patent Number: 5,361,065
[45] Date of Patent: * Nov. 1, 1994

[54] WINDSHEAR GUIDANCE SYSTEM

[75] Inventors: David A. Johnson, Glendale; Terry L. Zweifel; J. Rene Barrios, both of Phoenix, all of Ariz.

[73] Assignee: Honeywell Inc., Minneapolis, Minn.

[*] Notice: The portion of the term of this patent subsequent to Jan. 1, 2011 has been disclaimed.

[21] Appl. No.: 521,878

[22] Filed: May 11, 1990

[51] Int. Cl.$^5$ ............................................. G08B 23/00
[52] U.S. Cl. ..................................... 340/968; 244/184; 364/434; 340/967; 340/969
[58] Field of Search ............... 340/966, 967, 968, 969, 340/974, 975; 364/434; 73/178 T; 244/181, 182

[56] References Cited

U.S. PATENT DOCUMENTS

| | | |
|---|---|---|
| 4,763,266 | 8/1988 | Schultz et al. ............... 340/968 |
| 4,797,674 | 1/1989 | Zweifel et al. ............... 340/968 |
| 4,841,448 | 6/1989 | Ford ............................ 364/434 |
| 4,855,738 | 8/1989 | Greene ........................ 340/968 |
| 4,857,922 | 8/1989 | Miller et al. ................. 340/968 |

*Primary Examiner*—Donnie L. Crosland
*Assistant Examiner*—Brent A. Swarthout
*Attorney, Agent, or Firm*—Howard Paul Terry

[57] ABSTRACT

A windshear guidance system for guiding an aircraft during a microburst windshear is provided. This system includes a time comparison subassembly, an airspeed comparison subassembly and a pitch command subassembly. The pitch command subassembly includes a calibrated air speed source, latch means connected to the calibrated air speed source, switch means connected to the latch means, and a pitch guidance command unit connected to the switch means.

4 Claims, 2 Drawing Sheets

WINDSHEAR GUIDANCE SYSTEM

The invention relates to a windshear guidance system, and in particular the invention relates to a windshear guidance system having time and airspeed comparison subassemblies.

BACKGROUND OF THE INVENTION

The prior art aircraft guidance equipment does not have an automatic windshear guidance system.

One problem with the prior art aircraft guidance equipment is that it does not include a windshear guidance system, which can significantly decrease the hazards caused by windshear.

Flight guidance in increasing performance windshear is based on the fact that the weather phenomenon of a microburst in the vicinity of the approach or departure area of an airport, where aircraft are operating at low altitude, may lead to hazardous conditions, and crashes have been documented as a direct result of this problem. The spatial nature of a microburst relative to the flight path of an aircraft causes a significant headwind and/or updraft (increasing performance windshear) which is encountered prior to themost hazardous portion of the microburst, which will have a downdraft and/or tailwind (decreasing performance windshear). Thus, if the aircraft performance is adjusted sufficiently prior to the tailwind/downdraft portion of the microburst, the aircraft may be prevented from crashing.

SUMMARY OF THE INVENTION

According to the present invention, a windshear guidance system is provided to adjust the performance of the aircraft during the initial increasing performance windshear encounter such that the kinetic energy of the aircraft will be increased, and this increase in energy will help to prevent a crash during a subsequent decreasing performance windshear. In addition, this invention will not allow the aircraft to exceed structural speed limitations, or cause the aircraft to gain sufficient speed such that the pilot has difficulty in controlling the aircraft.

The foregoing and other objects, features and advantages will be apparent from the following description of the preferred embodiment of the invention as illustrated in the accompanying drawings.

DESCRIPTION OF THE PREFERRED EMBODIMENT

Figure 1:
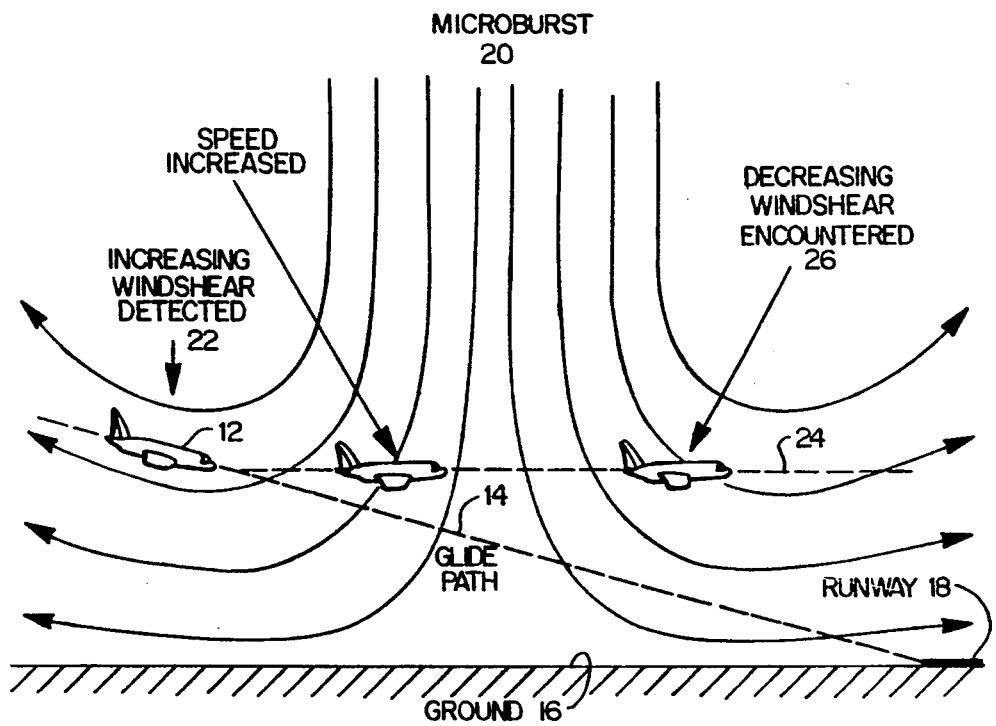
FIG. 1 is a schematic representation of an aircraft which has a guidance system according to the present invention and which is exposed to windshear.

As shown in FIG. 1, a windshear guidance system 10 is used in an aircraft 12. Aircraft 12 has a glide path 14, which is inclined relative to ground 16 and relative to a runway 18. When a microburst 20 occurs, an increasing performance windshear 22 is caused. When increasing performance windshear 22 is detected, system 10 increases the aircraft speed for travel along a new travel path 24. Aircraft 12 encounters thereafter a decreasing performance windshear 26 from microburst 20. The detection of windshear 22 or 26 is done by using a conventional windshear detector (not shown).

Figure 2:
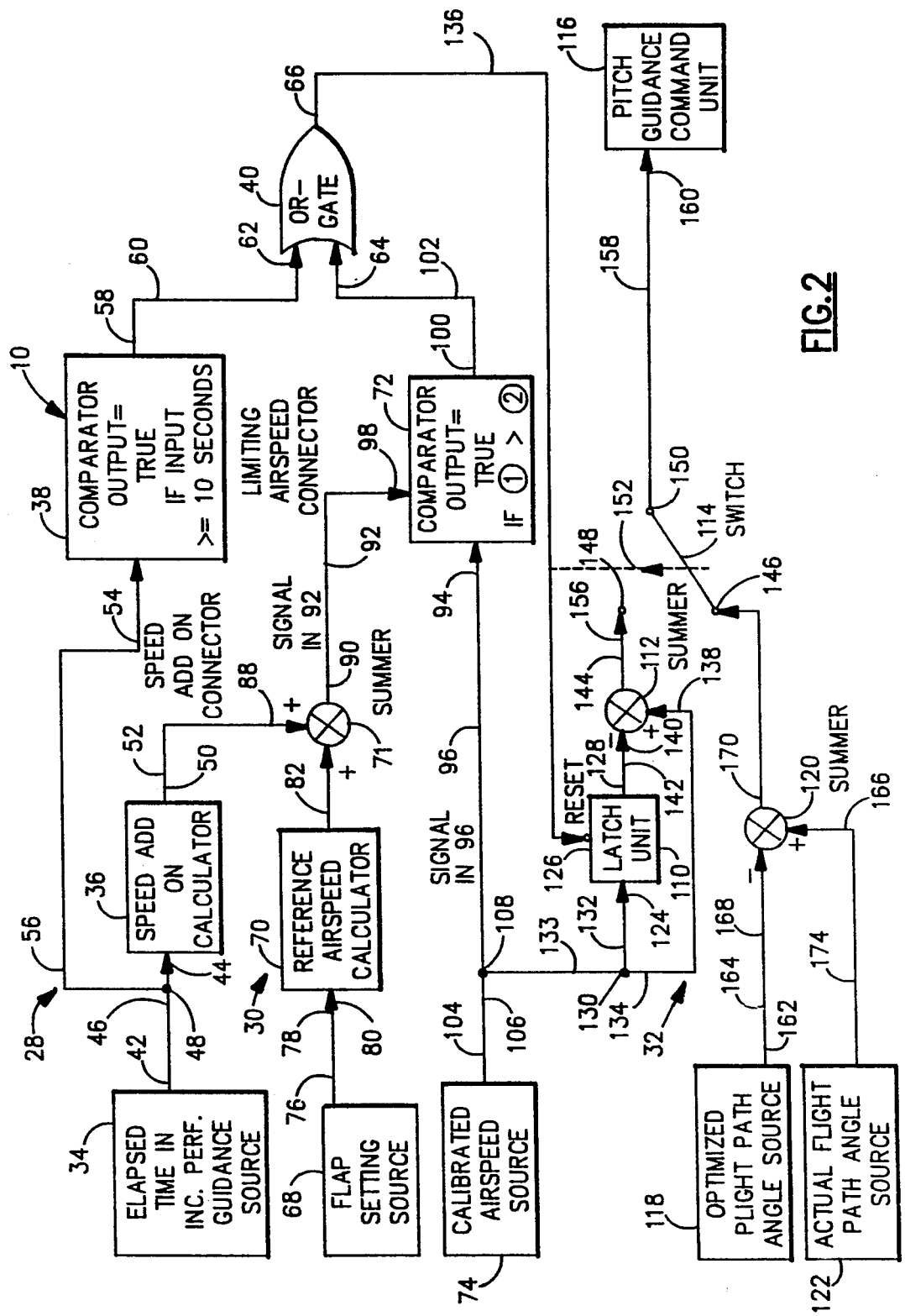
FIG. 2 is a block diagram of the guidance system.

As shown in FIG. 2, system 10 has a time comparison subassembly, or time sensing subassembly 28, an airspeed comparison subassembly, or airspeed sensing subassembly 30, and a pitch command subassembly 32.

Time comparison subassembly 28 has an elapsed time increasing guidance signal source or elapsed time source 34, a speed add on calculator 36, a time comparator 38, and an OR gate 40.

Elapsed time signal source 34 has an output terminal 42. Speed add on calculator 36 has an input terminal 44, and a connector 46, which has a junction 48. Connector 46 connects to terminal 42. Speed add on calculator 36 has an output terminal 50, which connects to a speed add on connector 52.

Time comparator 38 has an input terminal 54, which is connected to terminal 48 through a connector 56. Comparator 38 has an output terminal 58, which is connected to a connector 60.

Gate 40 has a first input terminal 62, which is connected to connector 60. Gate 40 also has a second input terminal 64 and an output terminal 66.

Airspeed comparison subassembly 30 has a flap setting signal source 68, a reference airspeed calculator 70, an adder or summer 71, an airspeed comparator 72, and a calibrated airspeed source 74.

Flap setting signal source 68 has an output terminal 76, which has a connector 78.

Reference airspeed calculator 70 has an input terminal 80, which connects to connector 78, and an output terminal 82, which has a connector 84.

Summer 71 has a positive first input terminal 86, a positive second input terminal 88, and an output terminal 90, which has a limiting airspeed connector 92. Terminal 86 connects to connector 84. Terminal 88 connects to connector 52.

Airspeed comparator 72 has a first input terminal 94, which connects to a connector 96, a second input terminal 98, which connects to connector 92, and an output terminal 100, which connects to a connector 102, that connects to terminal 64.

Calibrated airspeed source 74 has an output terminal 104, which is connected to a connector 106. Connector 106 has a junction 108, which is connected to connector 96.

Pitch command subassembly 32 has a latch unit 110, a summer unit 112, a switch unit 114, and a pitch guidance command unit 116. Subassembly 32 also has an optimized flight path angle source 118, a summer unit 120, and an actual flight path angle source 122.

Latch unit 110 has a first input terminal 124, a second input terminal or reset terminal 126, and an output terminal 128.

First input terminal 124 is connected to a junction 130 through a connector 132. Junction 130 is connected to a connector 133, which is connected to junction 108. Junction 108 is also connected to a connector 134.

Second input terminal 126 is connected to a connector 136, which is connected to terminal 66.

Summer 112 has a positive first input terminal 138, which is connected to connector 134. Summer 112 has a negative second input terminal 140, which is connected to a connector 142, that is connected to terminal 128. Summer 112 also has an output terminal 144.

Switch unit 114 has a first input terminal 146, a second input terminal 148, an output terminal 150, and a switch actuator 152. Terminal 146 has a connector 154.

Terminal 148 has a connector 156, which is connected to terminal 144. Terminal 150 has a connector 158.

Pitch guidance command unit 116 has an input terminal 160, which is connected to connector 158.

Optimized flight path angle source 118 has an output terminal 162, which has a connector 164.

Summer 120 has a positive first input terminal 166, a negative second input terminal 168, which is connected to connector 164, and an output terminal 170, which is connected to connector 154.

Actual flight path angle source 122 has an output terminal 172, which has a connector 174, that is connected to terminal 166.

In operation, a windshear detector (not shown) is utilized to determine that an increasing performance windshear is present, and when of a significant magnitude, the increasing performance windshear guidance is activated. Increasing performance windshear guidance initially commands an optimized flight path angle relative to the ground. The optimized flight path angle used is that which is utilized in current state of the art windshear guidance systems for dealing with decreasing performance windshear. This flight path angle, along with the fact that a headwind or updraft has been encountered, increases the measured airspeed of the aircraft. Once an increase in aircraft airspeed has been attained, the aircraft latches the higher airspeed as a target, and climbs at this higher constant airspeed. This increase in airspeed also increases the total energy of the aircraft since the kinetic energy is increased as shown in the following equation:

$$\text{Total Energy} = \text{Kinetic Energy} + \text{Potential Energy}$$

Kinetic Energy is defined as:

$$\text{Kinetic Energy} = \tfrac{1}{2} MV^2 = \tfrac{1}{2} MVV$$

Potential Energy is defined as $$\text{Potential Energy} = MgH$$

Where:
 M = Mass
 V = velocity
 g = gravity
 H = height above ground

It clearly is more efficient to increase the kinetic energy of the aircraft as opposed to increasing the potential energy (gaining altitude), since energy goes as the square of velocity, and the first power of altitude. This acceleration of the aircraft is constrained by factors which prevents overspeeding the aircraft, while setting the aircraft in such a state that a subsequent decreasing performance windshear encounter will not be as hazardous. If no decreasing performance windshear is encountered the pilot is not left with an aircraft which is dangerously overspeed. This is done by limiting the time for acceleration and/or the maximum speed allowed during acceleration.

In operation, as shown on FIG. 2, the actual calibrated airspeed signal in connector 96 is compared to a Limiting Airspeed signal in connector 92, which is computed as a function of Aircraft Flap Setting signal in connector 78 and Elapsed Time in increasing performance windshear guidance signal in connector 46. The Elapsed Time in guidance signal in connector 46 will be used to calculate a variable Airspeed Add On signal in connector 52, which will be added to a Reference Airspeed signal in connector 84 which is a function of Flap Setting signal in connector 78, to form the Limiting Airspeed signal in connector 92.

The variable Airspeed Add on signal in connector 52 is calculated as a function of time in increasing performance windshear guidance since the amount of airspeed the aircraft will gain is a function of the length of time in acceleration as well as how strong the windshear is, since a stronger windshear will give a higher acceleration, per the following equation:

$$\text{Airspeed Gain} = \text{Acceleration times Time in Windshear Guidance}$$

Therefore, for a very strong shear with a high acceleration, a shorter time in acceleration is allowed than a weak shear, where a longer time in acceleration is allowed. Since the lower the magnitude of the windshear, the less the aircraft will accelerate, the allowed Airspeed Add On will decrease as the Elapsed Time in increasing performance guidance increases.

Figure 3:
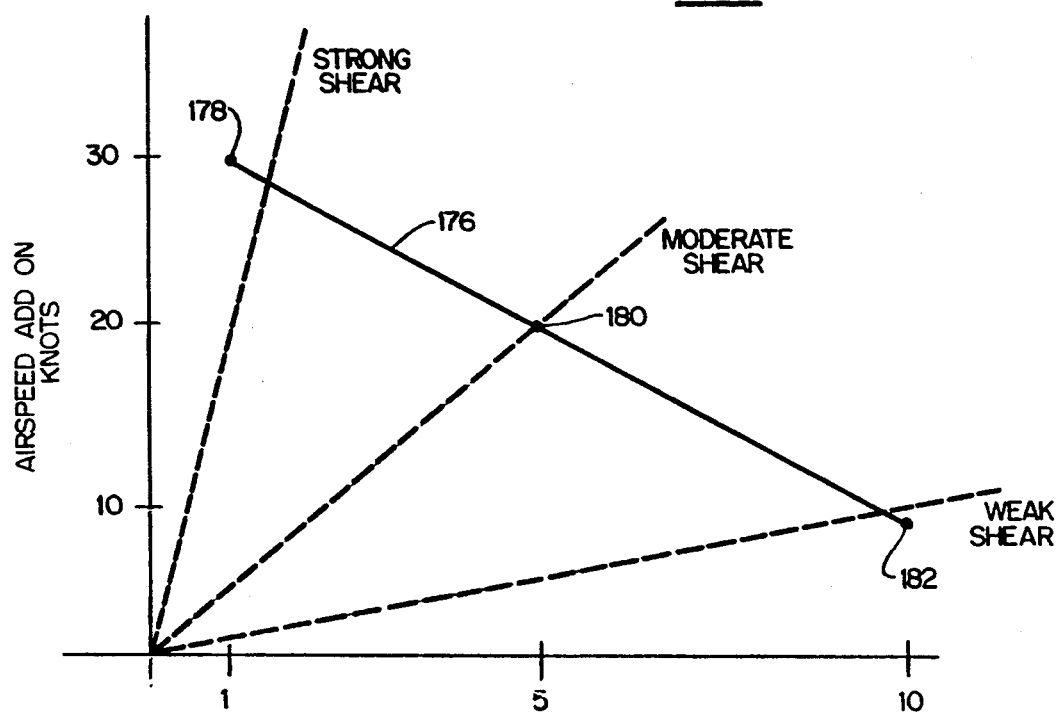
FIG. 3 is a graph of airspeed add on versus elapsed time in increasing performance windshear guidance.

An example of the Speed Add On is illustrated in the curve 176 in FIG. 3 where a continuously variable Speed Add on as a function of Elapsed Time in increasing performance guidance shows a 30 knot Speed Add On after 1 second at point 178, a 20 knot Speed Add On after 5 seconds at point 180, and a 10 knot Speed Add On after 10 seconds at point 182. Also shown on FIG. 3 are lines of constant acceleration for strong, moderate, and weak windshears.

The derivation of the example Speed Add On curve in FIG. 3 is based on the design criteria of:
1) Response to a minimum level of windshear of 0.05 g's which is approximately 1.0 knot/second of acceleration. Current state of the art windshear detection systems have approximately a 0.05 g minimum threshold for detecting windshear. In addition, operational considerations (pilot acceptability) of a maximum 10 second acceleration segment give the 10 knot Speed Add On after 10 seconds for the lowest level windshear.
2) Response to a moderate level of windshear of 0.20 g's which is approximately 4.0 knot/second of acceleration where half of the maximum allowable time (5.0 seconds) is used. This gives a 20 knot Speed Add On after 5 seconds.
3) Due to the inherent delay in detection of windshear in current state of the art detection systems, the aircraft may be significantly overspeed at the beginning of increasing performance guidance, therefore a maximum Speed Add On will be used with a minimum allowable Elapsed Time in acceleration. This yields a 30 knot Speed Add On after 1 second. The 30 knot Speed Add On is based on aircraft structural speed limitations.

The variable Speed Add On signal in connector 52 gives the advantage of increasing the total energy of the aircraft by utilizing the available energy of the windshear, while not delaying the climb segment of the aircraft if the aircraft will not accelerate with the energy of the encountered windshear.

Limiting Airspeed signal in connector 92 is compared to Actual Calibrated Airspeed signal in connector 96, and if signal in connector 96 is greater than or equal to signal in connector 92, then the output of logical OR Gate 40 is true. If Elapsed Time in increasing performance windshear signal at connector 46 is greater than or equal to 10 seconds (for example), then the output of logical OR Gate 40 will be true.

If the output of logical OR Gate 40 is false, then Airspeed Latch 110 will output Actual Calibrated Airspeed signal at connector 96 as Latched Airspeed signal at connector 142. If logical OR Gate 40 is true, then Airspeed Latch 110 will output Latched Airspeed signal at connector 142 as the last Actual Calibrated Airspeed signal at connector 96 before logical OR Gate 40 became true. Latched Airspeed signal at connector 142 will then be subtracted from Actual Calibrated Airspeed signal at connector 134 using Summing Junction 112 to form Airspeed Error signal at connector 156.

Optimized Flight Path Angle signal at connector 164 will be subtracted from Actual Flight Path angle signal at connector 174 using Summing Junction 120 to form Flight Path Angle Error signal at connector 154.

If the output 66 of logical OR Gate 40 is true then logical switch 114 will switch to use Airspeed Error signal at connector 156, otherwise logical switch 114 will switch to use Flight Path Angle Error signal at connector 154. The output of logical Switch 114 will be used as a Pitch Guidance Command signal at connector 158.

In summary, the operation is as indicated hereafter:
A. If an increasing performance shear is detected, the aircraft 12 is guided to the same optimal flight path as used for decreasing performance shears (1.5 degrees).
B. As the aircraft 12 accelerates, its speed is limited to preclude exceeding flap placard speeds.
C. An airspeed "add-on" is computed and added to the reference Takeoff/GoAround speed that is a function of the time that guidance has been active.
D. Once the limit speed is obtained, guidance is provided to maintain the limit speed.

The advantages of system 10 are indicated hereafter:
A. A windshear guidance system 10 is provided which can significantly reduce the hazards caused by windshear.
B. Prototype test results have shown that system 10 can significantly reduce the hazards caused by certain windshear encounters.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A windshear guidance system for an aircraft for adjusting the performance of an aircraft during an initial increasing performance windshear encounter such that the kinetic energy of the aircraft is increased and this increase in kinetic energy will help to prevent a crash during a subsequent decreasing performance windshear, comprising:
   a logical OR gate having a first input and a second input and an output;
   a time comparison means for measuring a level of elapsed time in an increasing performance windshear;
   said time comparison means having a time comparator having an input and having an output connecting to the OR gate first input;
   an airspeed comparison means for comparing a limiting airspeed signal to an actual calibrated airspeed signal;
   said airspeed comparison means having an airspeed comparator having a first input and a second input and an output connecting to the OR gate second input for comparing an actual calibrated airspeed signal at the airspeed comparator first input to a limiting airspeed signal at the airspeed comparator second input;
   wherein the level of elapsed time in increasing performance windshear is used as a signal to calculate a variable add on airspeed signal which is added to a reference airspeed signal that is a function of a flap setting signal to form the limiting airspeed signal and is also used as a signal to the time comparator input;
   wherein if said actual calibrated airspeed signal at the airspeed comparator first input is greater than or equal to the limiting airspeed signal at the airspeed comparator second input then the signal at the output of the OR gate is true;
   wherein if the elapsed time in increasing performance windshear at the time comparator input is greater than or equal to a selected number of seconds then the signal at the output of the OR gate is true;
   a pitch command means for adjusting the angle of pitch of the aircraft;
   said pitch command means including:
   an actual calibrated airspeed source having an output for providing a calibrated airspeed signal;
   airspeed latch means having an output and having a first input connecting to the output of the calibrated airspeed source and having a second reset input connecting to the output of the OR gate for control of the latch means by the OR gate;
   wherein if the signal at the output of the OR gate is false then airspeed latch means will output the actual calibrated airspeed signal at the airspeed latch means output;
   wherein if the signal at the output of OR gate is true then airspeed latch means will output a latched airspeed signal at the airspeed latch means output as the last calibrated airspeed signal at airspeed comparator first input before OR gate became true;
   summer means having a positive first input connecting to the calibrated airspeed source output and a negative second input connecting to the airspeed latch means output and an output;
   wherein the latched airspeed signal at negative second input is subtracted from the calibrated airspeed signal at the positive first input to form an airspeed error signal at summer means output;
   a flight path angle error means;
   a switch means having a first input at a first switch position connecting to the flight path angle error means and having a second input at a second switch position connecting to the summer means output for receiving alternately the airspeed error signal and having an output;
   said switch means having a switch actuator for connecting either the first input or the second input to the output;
   said switch actuator receiving and being responsive to the signal at the OR gate output;
   wherein if the output signal at the OR gate output is true then the switch means will switch to use the airspeed error signal at the second input at a second switch position;

wherein if the output signal at the OR gate output is false then the switch means will switch to use the flight path angle error signal at the first input at a first switch position; and pitch guidance command means having an input connecting to the switch means output for receiving either the airspeed error signal or the flight path angle error signal;

whereby if an increasing performance shear is detected then the aircraft is guided to the same optimal flight path as used for decreasing performance shear and as the aircraft accelerates its speed is limited to precluding exceeding flight placard speeds and an add on airspeed is computed and added to the reference takeoff/goaround speed that is a function of the time that windshear guidance has been active.

2. The system of claim 1, wherein the flight path angle error means includes:

an optimized flight path angle source having an output;

an actual flight path angle source having an output; and a second summer means having a positive first input connecting to the actual flight path angle source output and having a negative second input connecting to the optimized flight path angle source output and having an output connecting to the switch first input.

3. The system of claim 2, wherein the time comparison means includes;

an elapsed time in increasing performance guidance source having an output connecting to the time comparator input.

4. The system of claim 3, wherein the airspeed comparison means includes:

a speed add on calculator having an input connecting to the elapsed time source output and having an output;

a flap setting source having an output;

a reference airspeed calculator having an input connecting to the flap setting source output and having an output; and a third summer having a positive first input connecting to the reference airspeed calculator output and having a positive second input connecting to the speed add on calculator output and having an output connecting to the airspeed comparator second input.

* * * * *